May 31, 1955     S. V. COLLINS     2,709,491
BAND CLIPPER RELEASING DEVICE FOR PIPE LINE FLOATS
Original Filed July 13, 1950     3 Sheets-Sheet 1
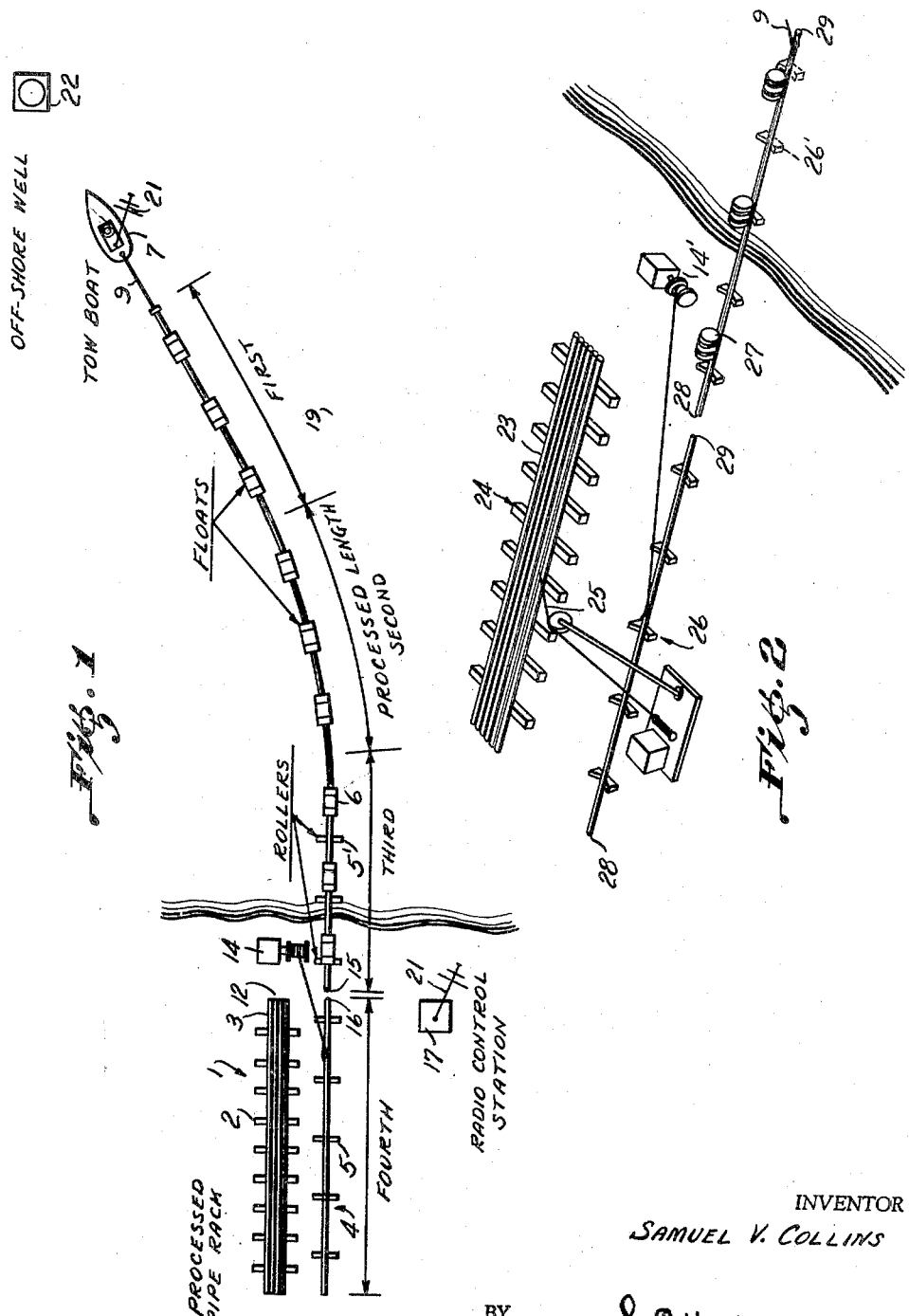
INVENTOR
SAMUEL V. COLLINS
BY
ATTORNEY May 31, 1955      S. V. COLLINS      2,709,491
BAND CLIPPER RELEASING DEVICE FOR PIPE LINE FLOATS
Original Filed July 13, 1950      3 Sheets-Sheet 2
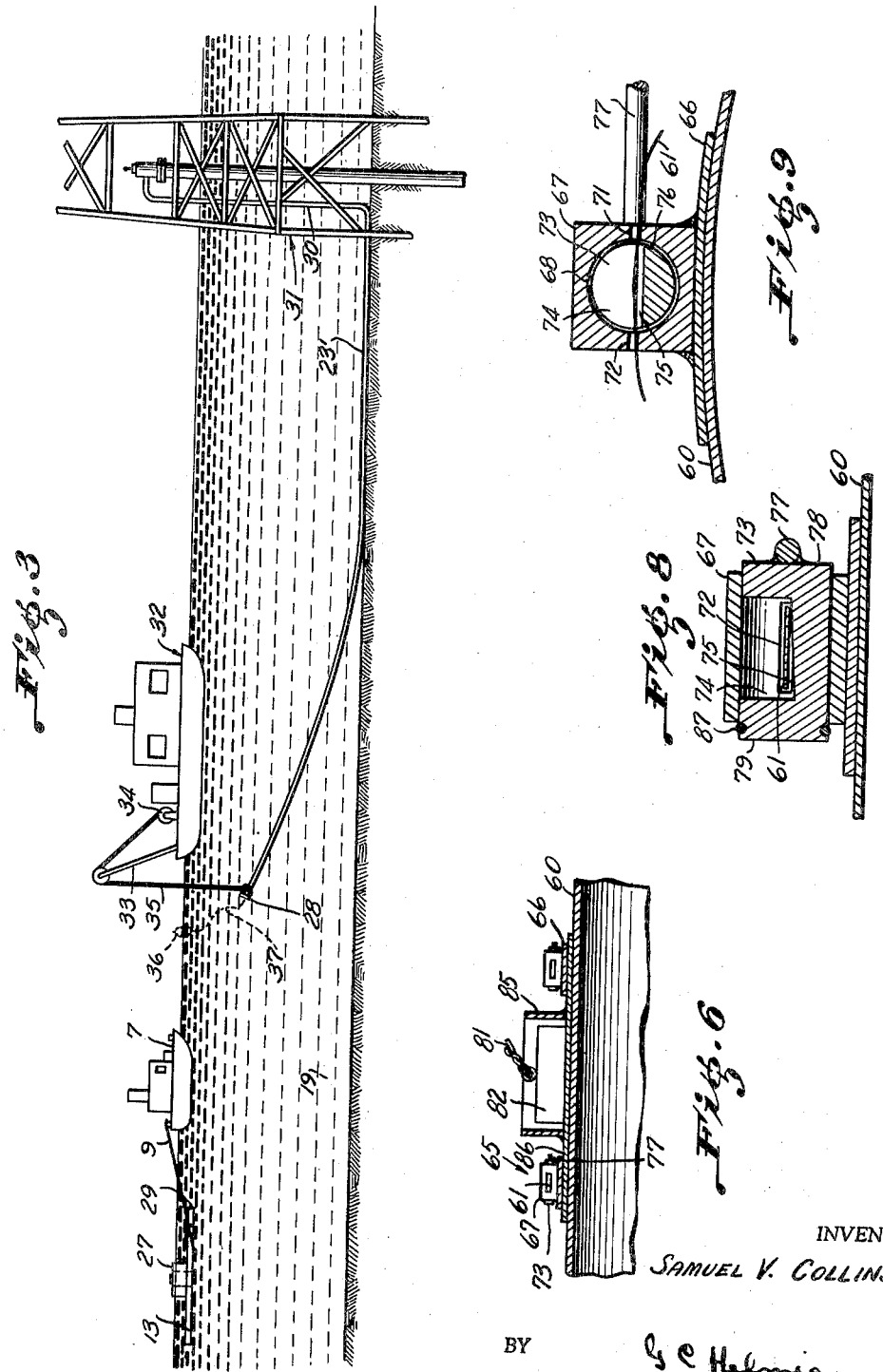
INVENTOR
SAMUEL V. COLLINS
BY
ATTORNEY May 31, 1955  S. V. COLLINS  2,709,491
BAND CLIPPER RELEASING DEVICE FOR PIPE LINE FLOATS
Original Filed July 13, 1950  3 Sheets-Sheet 3
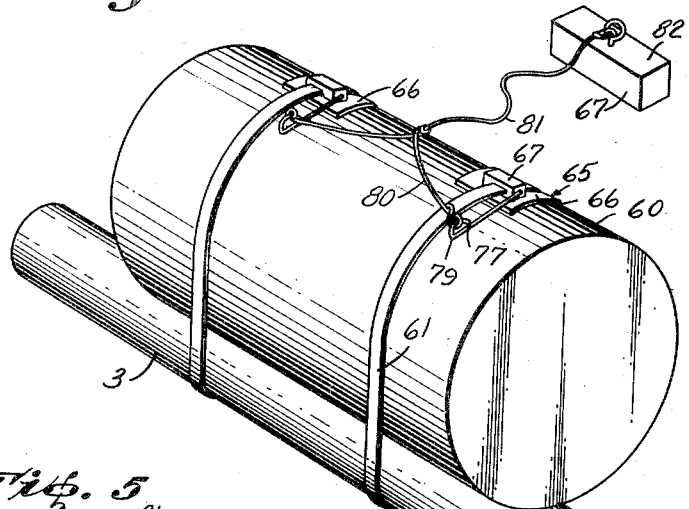
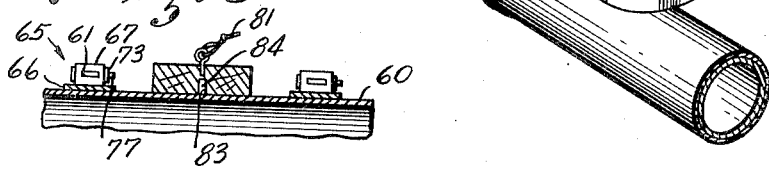
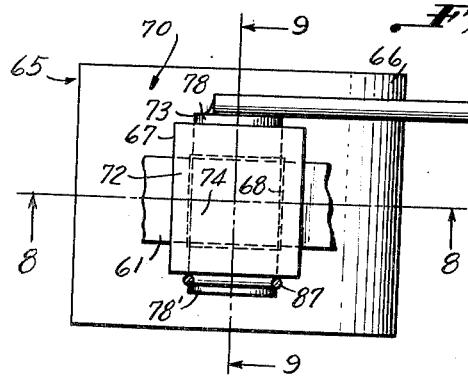
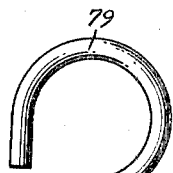
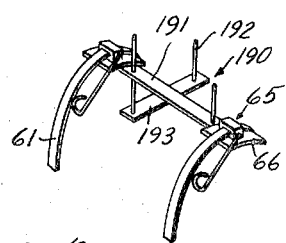
INVENTOR
SAMUEL V. COLLINS
BY  
ATTORNEY United States Patent Office 2,709,491
Patented May 31, 1955

2,709,491

BAND CLIPPER RELEASING DEVICE FOR PIPE LINE FLOATS

Samuel V. Collins, Port Lavaca, Tex.

Original application July 13, 1950, Serial No. 173,623. Divided and this application August 7, 1951, Serial No. 240,761

2 Claims. (Cl. 164—43)

This invention relates to a band clipper releasing device for pipe line floats which may be employed for accomplishing the movement of pipe lines in bodies of water. This application is a divisional application of parent application Serial No. 173,623 filed July 13, 1950, now issued as Patent No. 2,602,300 under date of July 8, 1952.

It is an object of this invention to provide a retrievable band clipper releasing device to clip the band thereof connecting the device to the float, the clipper being thus operable to release the float with a minimum effort when such release is desirable.

It is a further object of this invention to provide a retrievable float releasing device of this class so operable that the floats may be easily disconnected from the line upon the water and recovered.

Other and further objects of this invention will be apparent when the specification will be considered in connection with the drawings in which:

Fig. 1 is a diagrammatic planned view showing the method of extending a pipe line from shore to a nearby location as an off-shore well.

Fig. 2 is a perspective view showing a step in the launching of pipe sections which are to be floated to sea and welded at sea to the completed portion of the pipe line.

Fig. 3 shows the step following that shown in Fig. 2; in this figure the section being towed is shown approaching the completed portion of the line while the completed portion of the line is being raised so that the towed sections may be connected thereto.

Fig. 4 is a perspective view showing a float connected to a pipe section.

Fig. 5 is a fragmentary sectional elevation showing one means of maintaining the band clipper float block on a float barrel until the float block is in contact with the water.

Fig. 6 is a fragmentary sectional elevation showing a second modification of a structure for maintaining a float block on a float barrel until the block floats on the water.

Fig. 7 is a plan view of a band clipper employed on floats to sever the bands connecting them to the pipe line when it is desired to sink the pipe line to the ocean floor.

Fig. 8 is a transverse sectional view taken along line 8—8 of Fig. 7.

Fig. 9 is an axial sectional view taken along line 9—9 of Fig. 7.

Fig. 10 is a perspective view, with barrel omitted, showing another modification of a means for maintaining the band clipper float block on the float barrel.

Fig. 11 is a perspective view showing a modification of the means shown in Fig. 10.

In conventional methods of launching pipe heretofore used, in cases where float means have been connected to pipe sections, great difficulty has also been encountered in disconnecting the float means when it has been desired to sink the pipe, and additional difficulties and losses have resulted in endeavoring to recover the float means. The equipment covered by this invention, and the methods employed, set out to remedy these enumerated difficulties and other obvious ones inherent to the art of extending pipe lines in bodies of water.

As shown in Fig. 1, a pipe rack 1 is provided comprising spaced apart support members 2 forming a line preferably perpendicular to the shore. Sections of processed pipe 3 may then be assembled upon, or brought to the pipe rack. Adjacent the pipe rack 1, and extending parallel thereto, the launchway 4 is provided. As shown, this launchway comprises spaced apart rollers 5 to be hereinafter described. A pipe section 3 is then moved from rack 1 to launchway 4 and float means 6 are connected thereto at spaced apart intervals. The seaward end 16 of the section is then plugged.

The pipe section 3, with floats attached, is then moved axially seaward upon the rollers 5' which extend into the water. The section is launched far enough, in this manner, to permit a towing means, as a tow boat 7, to attach a towing line 9 thereto. The tow boat then tows the section seawardly in the desired direction, until the landward end 15 of the pipe section 3 is adjacent the seaward end 12 of the racked pipe. The winch 14 is provided to handle the pipe sections 3, and such is shown being used to bring the seaward end 16 of a section on the launchway 4 into abutment with the landward end 15 of the preceding launched section.

To control the movement of the pipe by the tow boat 7, vocal control is first used from the control station 17 ashore, so that the pipe end 16 and pipe end 15 may be kept adjacent each other for alignment, abutment, and welding. It is thus apparent that the director on shore must closely observe the ends 15 and 16 and that he must communicate timely with the tow boat operator who responds promptly to stop the tow boat.

When the ends have been abutted and welded, and the coating replaced and completed about the welded joint, the tow boat is then ready to proceed to tow the pipe line seawardly until the end 15 of the section just added is adjacent the end 12 of the rack 1.

When this process has continued until the tow boat 7 is out of vocal communication range, communication may then be conducted by radio, both the control station 17 ashore and the tow boat 7 being equipped with transmitting and receiving sets 21. This method of communication may then be used until the pipe line is extended to location, as to the other side of the body of water 19, or to an off-shore well 22. When the pipe line has been extended to desired location, and it is desired to sink the line to the floor beneath the body of water, the float means 6 are disconnected from the line and are retrieved. The method of accomplishing this will be set forth hereinbelow.

In cases where the off-shore location, or the body of water to be traversed, comprises too great a distance for handling pipe by the above described method, the method of Figs. 2 and 3 may be employed. In this method, pipe sections 23 usually of considerably greater size and length than the sections 3, are assembled or positioned on the rack 24, and are handled therefrom by the cat line 25 onto the launchway 26. When float means 27 are connected to the pipe sections and both the inboard end 28 and outboard end 29 is plugged, and the section is launched down the launchway extension 26' until a towing line 9 from the tow boat 7 may be connected to the outboard end 29. The winch 14' is provided for handling the pipe in launching.

The tow boat 7 then tows the floated pipe sections to sea, the first section 23' being connected by conventional means and methods to a location, as to the riser 30 of the off-shore well 31. Subsequent sections are added by the method shown in Fig. 3 whereby a craft 32 equipped with a boom 33, winch 34, and handling line 35 as shown, is employed to lift the end 28 of a pipe section, to be aligned with the end 29 of the approaching section 23, towed by the tow boat 7, so that the ends, after being unplugged, may be welded together and the uncoated surface about the welded joint coated while held out of the water 19.

After this occurs the float means 27 are detached from the newly added section so that it may sink into the water. The float means are then recovered for further use as will be hereinafter described.

In every case where it is desired to release the craft 32 from its purchase on the pipe line, a buoy or marker 36 is connected to the end 28 of the added section, by a line 37 of greater length than the depth of water at that point. Thus the floating marker indicates to the crew of the craft 32 the next point at which they are to connect the pipe line end to be raised.

The floats 6 and 27 have as their buoyant element the water tight barrels 60. These barrels are installed on top of the conduit such as the pipe 3 by means of the bands 61 which extend around the pipe and a side of the barrel, and then pass through the band clipper 65 for connection, by conventional means, with the band portion around the other side of the barrel.

The band clipper 65 has a base 66 which is preferably curved in one direction to conform with the curvature of the barrel. A block 67 is connected centrally of the base 66 and has the bore 68 therethrough transversely of the curvature of the base. The base 66 and block 67 together constitute the band clipper housing 70. The housing has the opposed slots 71 and 72 through the walls thereof and parallel to, and on substantially the same horizontal plane, as the bore axis.

A cylinder 73 is provided to fit within the bore 68, such cylinder being cut away centrally at 74, as shown in Fig. 8, for a length slightly greater than the length of the slots 71 and 72. The cut away section 74 extends below the horizontal plane of the bore axis, and terminates in a surface 75, tapered axially to provide a sloped shearing edge 76 for positively shearing the band 61 when the lever 77, connected to the cylinder end 78 transversely of the cylinder axis, is pulled upwardly. The opposite cylinder end 78' has the retaining ring 87 thereon to hold the cylinder 73 in place on the block 67.

Each lever 77 has the curved end 79 into which a line 80 may be tied. These lines 80 joint a common line 81 which is connected to a float block 82, of wood or similar buoyant material. The line 81 is of a pre-determined length dependent upon the fathomed depth of water, so that the block 82 will float on the surface when the pipe or conduit is submerged.

To maintain the float block 82 on top of the barrel 60 until it floats thereabove, and thereby prevent it from interfering with the launching operation by dangling beside the barrel, various means may be employed. As shown in Fig. 5 a lug 83 may be welded onto the barrel 60 to fit within a hole 84 in the float block. Optionally, a receptacle 85 may be provided, which has an arm 86 extending on either side thereof to be held beneath a clipper 65 as shown in Fig. 6.

As a feature of this invention it is pointed out that each pair of band clippers 65 and the lines and blocks connected thereto may be recovered. It is simply necessary to direct a craft along a pipe section to be sunk, and an operator therein has only to lift up on the block 82 to cause each band clipper 65 to sever a band 61. The entire band clipper and float block assembly may then be lifted into the craft and retrieved for future use. The barrels 60 are also easily retrieved as they can be grappled and brought aboard the craft as soon as they rise to the surface after the severing of the bands 61.

In addition to the means hereinabove described for maintaining the float blocks 67 on top of the barrels 60, a device 190 may be provided comprising a lath strip 191 having two nails 192 therein spaced apart a distance just greater than the length of the block. The line 81 is then wound lightly around the two nails 192 and the block. The ends of the lath are confined in assembly beneath the bases 66 of the band clippers 65.

An optional device of the same type includes a cross piece 193 also having nails 192 therein, and spaced apart a distance just greater than the width of the block 67. This device insures that the block 67 is not bound by the line 81 so that it readily floats when the barrel 60 is submerged therebelow in the water.

It is obvious that the same or similar types of equipment may be employed to remove a pipe line from beneath a body of water. In such case a section to be floated, when free and plugged at both ends, is supported from the surface, first at one end, until barrels can be installed a distance therealong. It may then be supported from the surface at successive points until finally enough barrels have been installed thereon to float the section so that it may be towed to the shore. The launchway provided for launching may then be employed to guide the section inboard. The barrels may be removed from the section ashore or on the water in the vicinity of the shore line. From the launchway, the section may be handled onto the rack. These steps are repeated until all the pipe line is ashore.

This invention broadly sets out to provide more efficient methods for extending pipe lines, usually consisting of processed or coated pipe sections, to off-shore locations and in bodies of water. The apparatus and various devices disclosed are within the scope of this invention, as are other structures which can carry out the methods disclosed.

Broadly, therefore, this invention considers both a method of floating pipe lines, and the float means therefor and it especially considers an easily operable float severing means, both of which means are retrievable.

What is claimed is:

1. A banding strap clipper to be retained in assembly relation with the banded load by a banding strap, including a stress distributing base plate for relatively wide surface area friction contact with the load, a boss upstanding from the plate and having a pivot mounting socket therein, a strap bearing guide formed on the boss to receive the retaining strap in intersecting relation to said pivot mounting socket, a strap cutting member having a circular segment portion for rotary movement in said socket and normally lying below said strap bearing guide so as to be bridged by the retaining strap, an axial edge of said circular segment portion constituting a shearing edge for co-operation with said guide upon rotary movement of the member to sever the banding strap, cylindrical heads at opposite ends of the circular segment portion pivotally mounted in the socket and projected beyond both ends thereof, an operating lever fixed to one of said heads and extended beside the adjacent end of the socket in locating relation thereto and a detachable projection carried by the opposite end head in locating relation with the socket end adjacent thereto, said lever and said detachable projection co-operating to hold the circular segment portion rotatably in the socket.

2. A band clipper to be banded to a banded load, including a relatively wide area base plate to bear against the load and having a bearing surface shaped to conform to the load surface against which it is to be band clamped, an upstanding boss on the plate, a cylindrical member pivotally mounted in said boss for rocking movement and formed with a parti-cylindrical central portion having a shearing edge along one axially extending margin and a band receiving clamping seat on the boss arranged to receive a clamping band for holding the clipper on the load and to position the band above said shearing edge for cooperation with the shearing edge upon rocking movement of the member in a band severing operation.

References Cited in the file of this patent

UNITED STATES PATENTS

| | | |
|---|---|---|
| 375,464 | Thacher et al. | Dec. 27, 1887 |
| 384,847 | Hinsdale | June 19, 1888 |
| 1,873,563 | Euth | Aug. 23, 1932 |
| 1,887,460 | Nelson | Nov. 8, 1932 |
| 2,249,575 | O'Brien et al. | July 15, 1941 |
| 2,272,440 | Streckfuss | Feb. 10, 1942 |
| 2,385,813 | Jessen | Oct. 2, 1945 |
| 2,502,582 | Murphy et al. | Apr. 4, 1950 |
| 2,536,023 | Besner | June 2, 1951 |